United States Patent
Ooi et al.

(10) Patent No.: US 12,413,837 B2
(45) Date of Patent: Sep. 9, 2025

(54) INFORMATION HANDLING SYSTEM CAMERA MULTI-FILTER ICR WITHIN A DEFINED FOCAL DISTANCE

(71) Applicant: Dell Products L.P., Round Rock, TX (US)

(72) Inventors: Ghee Beng Ooi, Singapore (SG); Chih-Hao Kao, New Taipei (TW); Chien Chih Liao, Taipei (TW); Yi Hsien Lin, Taipei (TW)

(73) Assignee: Dell Products L.P., Round Rock, TX (US)

( * ) Notice: Subject to any disclaimer, the term of this patent is extended or adjusted under 35 U.S.C. 154(b) by 131 days.

(21) Appl. No.: 18/212,986

(22) Filed: Jun. 22, 2023

(65) Prior Publication Data
US 2024/0430551 A1    Dec. 26, 2024

(51) Int. Cl.
*H04N 23/55* (2023.01)
*G02B 5/20* (2006.01)
*H04N 23/67* (2023.01)
*H04N 23/745* (2023.01)

(52) U.S. Cl.
CPC ............ *H04N 23/55* (2023.01); *G02B 5/205* (2013.01); *G02B 5/208* (2013.01); *H04N 23/67* (2023.01); *H04N 23/745* (2023.01)

(58) Field of Classification Search
CPC ...... H04N 23/55; H04N 23/67; H04N 23/745; G02B 5/205; G02B 5/208
See application file for complete search history.

(56) References Cited

U.S. PATENT DOCUMENTS

| | | | |
|---|---|---|---|
| 8,896,744 B2 | 11/2014 | Ogasahara et al. | |
| 10,018,804 B2 | 7/2018 | Prabhakar | |
| 10,237,458 B2* | 3/2019 | Lim | G06V 40/19 |
| 10,353,171 B2 | 7/2019 | Hatada | |
| 10,830,931 B2 | 11/2020 | Kubo et al. | |
| 10,893,248 B2 | 1/2021 | Otsubo et al. | |
| 10,958,847 B2 | 3/2021 | Sakamoto et al. | |
| 11,163,097 B1* | 11/2021 | Brailovskiy | G02B 5/201 |
| 11,212,450 B2* | 12/2021 | Choi | H04N 23/55 |
| 2012/0008930 A1* | 1/2012 | Barley | G03B 15/03 396/155 |

(Continued)

FOREIGN PATENT DOCUMENTS

JP    2015200838    11/2015

OTHER PUBLICATIONS

U.S. Appl. No. 17/837,551, filed Jun. 10, 2022, entitled "Multifocal Camera by Refractive Insertion and Removal Mechanism," by inventors Yi-Hsien Lin et al.

*Primary Examiner* — Padma Haliyur
(74) *Attorney, Agent, or Firm* — Zagorin Cave LLP; Robert W. Holland

(57) ABSTRACT

An information handling system camera supports plural filters selectively inserted between a lens and an image sensor by plural actuators disposed around the perimeter of the lens and image sensor so that the actuators do not add to the vertical height of the camera. Plural actuators support simultaneous insertion of plural filters that cooperate to offer day, night, distance detection and camera focus distance and zoom levels by refractive manipulation of light passing through a neutral density (transparent) piece of material of an increased thickness.

16 Claims, 4 Drawing Sheets

(56) References Cited

U.S. PATENT DOCUMENTS

| | | | |
|---|---|---|---|
| 2016/0148048 A1* | 5/2016 | Prabhakar | G06V 40/197 348/78 |
| 2018/0348596 A1* | 12/2018 | Reed | G03B 11/00 |
| 2019/0020850 A1* | 1/2019 | Meyers | H04N 23/698 |
| 2019/0173987 A1* | 6/2019 | Sung | G02B 7/02 |
| 2020/0068102 A1 | 2/2020 | Tileman | |
| 2020/0104566 A1* | 4/2020 | Yamada | H04N 23/73 |
| 2020/0169679 A1 | 5/2020 | Matsumura | |
| 2022/0082814 A1* | 3/2022 | Kielczewski | G03B 11/00 |
| 2022/0166906 A1* | 5/2022 | Galindo | G02B 5/20 |
| 2022/0174200 A1 | 6/2022 | Xiong | |

\* cited by examiner

INFORMATION HANDLING SYSTEM CAMERA MULTI-FILTER ICR WITHIN A DEFINED FOCAL DISTANCE

BACKGROUND OF THE INVENTION

Field of the Invention

The present invention relates in general to the field of information handling system cameras, and more particularly to an information handling system camera having multi-filter ICR within a defined focal distance.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems integrate processing components, a display and a power source in a portable housing to support mobile operations. Portable information handling systems allow end users to carry a system between meetings, during travel, and between home and office locations so that an end user has access to processing capabilities while mobile. Tablet configurations typically expose a touchscreen display on a planar housing that both outputs information as visual images and accepts inputs as touches. Convertible configurations typically include multiple separate housing portions that couple to each other so that the system converts between closed and open positions. For example, a main housing portion integrates processing components and a keyboard and rotationally couples with hinges to a lid housing portion that integrates a display. In clamshell configuration, the lid housing portion rotates approximately ninety degrees to a raised position above the main housing portion so that an end user can type inputs while viewing the display. After usage, convertible information handling systems rotate the lid housing portion over the main housing portion to protect the keyboard and display, thus reducing the system footprint for improved storage and mobility.

One common function of portable information handling systems is to provide a communication tool, such as by support videoconferencing. Typically, portable information handling systems integrate a camera in the system housing near the display so that an end user viewing the display during a videoconference will appear to be looking into the camera. One difficulty with this approach is that the housing that holds the display is typically designed to have a minimal thickness so that a camera integrated in the display housing typically has minimal vertical stack to include a lens with any zoom capability. Often, cameras integrated in a portable information handling system housing have a limited focal distance between the lens and the image sensor so that a wide lens is typically used. Within the defined space between the image sensor and lens, the camera also typically has to include any filters desired for use in the capture of visual images. In some instances, filters of nonvisible light help a camera sensor to capture improved images. In other instances, a filter of light outside of a defined infrared band helps a camera to capture images in low light conditions.

One solution that helps to filter camera light is an infrared cutfilter removal (ICR) module associated with the camera lens. A typical ICR module has a planar filter coupled to an actuator that adjusts the filter relative to the lens so that the application of the filter is managed as desired. One example ICR module has first and second filter types on opposite ends of one planar filter glass piece so that the actuator selects one or the other filter type, such as for day and night camera operations. In such a dual filter on a single glass piece, the thickness of the filter has to fit between the lens and image sensor and the actuator is typically located to one side of the camera lens. Although the ICR module adds to the width of the camera, the insertion of the filter does not impact the height of the camera or the focal length, however, the camera is limited to operate with one or the other of the filter types. In a recent innovation, an ICR module was used to insert a filter having a thickness that refracts light to change the focus of a camera without impacting the camera's vertical height, as set forth in U.S. patent application Ser. No. 17/837,551, entitled Multifocal Camera by Refractive Insertion and Removal Mechanism, filed Jun. 10, 2022, by Yi-Hsien Lin, Chih-Hao Kao and Ghee Beng Ooi, and assigned to Dell Products L. P., which is incorporated herein as if fully set forth. A difficulty with this approach is that an ICR actuator only selects between first and second filters.

SUMMARY OF THE INVENTION

Therefore, a need has arisen for a system and method which provides an arrangement of multiple filters within a defined camera vertical spacing.

In accordance with the present invention, a system and method are provided which substantially reduce the disadvantages and problems associated with previous methods and systems for inserting and removing a filter between a camera lens and image sensor. First and second actuators couple at first and second sides of a camera lens to selectively slide first and second filters between the camera lens and image sensor.

More specifically, an information handling system processes information with a processor that executes instructions in cooperation with a memory that stores the instructions and information. A camera couples to a housing of the information handling system to capture visual images with an image sensor and lens, such as to support a video conferencing application executed by the processor. The camera includes plural filters that selectively intercede between the camera lens and image sensor to adjust light captured by the image sensor, each filter actuated by one of plural actuators, such as a solenoid arranged like an infrared cutfilter removal (ICR). In one example embodiment, a filter frame coupled to a first actuator includes a visual light filter and an infrared filter that each selectively align with the lens and image sensor by actuation of the first actuator, and a transparent thick filter coupled to a second actuator selectively aligns with the lens and image sensor to adjust the camera focus. The first and second actuators are located at opposite sides of the lens so that the overall height of the camera is not impacted by including two actuators.

The present invention provides a number of important technical advantages. One example of an important technical advantage is that plural light filters supported by plural actuators do not increase the vertical height of a camera to support installation in a low profile information handling system housing. With plural actuators, plural filters may be applied to a camera and lens alignment simultaneously, such as to support both day or night image capture with first and second focus distance provided by a transparent piece of material to refract light. In one example embodiment, an infrared filter and neutral density filter (plain glass) may be used simultaneously to resolve image flicker issues. In another embodiment, a diffuser inserts to enhance privacy with a far focus or near focus, such as with different amounts of light refraction by transparent glass of different thicknesses. In another embodiment, a filter may be formed as a lens than inserts between the camera lens and image sensor to change camera focal length (zoom). In one example embodiment, a portion of the filter may block the passage of light as a privacy shutter. In an embodiment having an infrared pass filter with a band of an infrared transmitter, an actuator aligns the infrared filter so that only a depth camera function of the camera is operational and no visual images are captured.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system camera includes multiple actuators to actuate multiple light filters. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
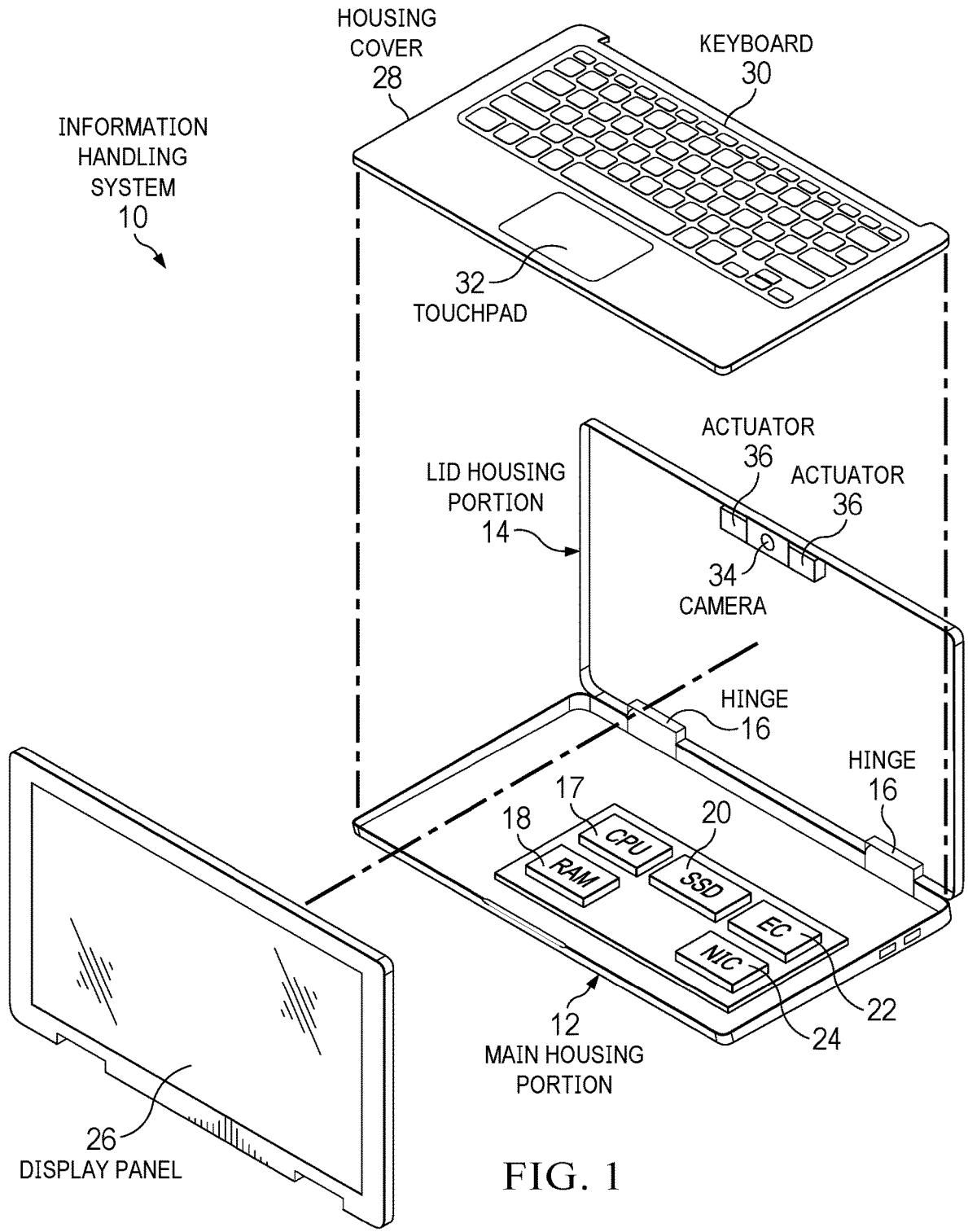
FIG. 1 depicts an exploded perspective view of an information handling system having a camera with multiple actuators to actuate multiple filters.

Referring now to FIG. 1, an exploded perspective view depicts an information handling system 10 having a camera 34 with multiple actuators 36 to actuate multiple filters. The example information handling system 10 is built into a portable housing having a main housing portion 12 rotationally coupled to a lid housing portion 14 by hinges 16 to rotate between open and closed positions. In alternative embodiments, the camera may be incorporated in other types of information handling systems, such as tablets, in peripheral displays and in camera specific housings for peripheral camera implementations. Information handling system 10 processes information with a central processing unit (CPU) 17 that executes instructions in cooperation with a random access memory (RAM) 18 that stores the instructions and information. A solid state drive (SSD) 20 provides persistent storage of information, such as with flash memory integrated circuits. For instance, an operating system and applications stored in SSD 20 are retrieved to RAM 18 at power up for execution by CPU 17. An embedded controller 22 manages operating conditions within the system housing, such as the application of power, maintenance of thermal constraints and communication between physical devices and with peripheral devices. For instance, at power up of the system by the embedded controller, execution of preboot instructions brings CPU 17 to an operational state executing the operating system and configured to interact with devices such as camera 34. A network interface controller 24 supports communication with external devices through wired connections, such as Ethernet, as wireless connections, such as WIFI and Bluetooth.

Information handling system 10 interacts with an end user through input/output (I/O) devices. The example embodiment accepts inputs through a keyboard 30 and touchpad 32 integrated in a housing cover 28 that couples over main housing portion 12. In alternative embodiments, external peripheral input devices may also provide inputs to the information handling system, such as a Bluetooth keyboard and mouse. An integrated display panel 26 in lid housing portion 14 outputs information as visual images to an end user, such as in windows defined by the operating system that present operating system or application output. Camera 34 is positioned in lid housing portion 14 and behind display panel 26 so that it can capture visual images of a field of view in front of display panel 26, such as through an opening in the bezel around the perimeter of display panel 26. For instance, a video conferencing application running on CPU 17 over the operating system by leveraging a camera driver to communicate with camera 34 may capture visual images to support a video conference.

In the example embodiment, camera 34 has a first actuator 36 that selectively aligns one of a visual light filter or an infrared filter with a lens and image sensor to capture visual images. Camera 34 also has a second actuator 36 that selectively aligns a separate visual image filter with the camera lens and sensor to adjust the field of view captured by the camera. Each actuator 36 interfaces with a processing resource of the camera, such as logic included with the light sensor, and with embedded controller 22 so that the camera driver can control the type of light and field of view of camera 34 as desired by an end user to support the videoconferencing and other applications. Each actuator 36 selects a first or second position associated with a first and second filter alignment. For instance, the actuator is a solenoid or similar devices that slides the filter left and right to achieve the desired light filtering or field of view effect in response to a GPIO output by embedded controller 22. A number of different operational configurations can result from actuator selection of filter positions. In daylight operations, a visible light filter is actuated between the lens and image sensor to pass through visible light and filter out other light that might interfere with capture of a visual image. The other actuator adjusts between a wide field of view and a narrow field of view by selectively sliding a refractive piece of transparent material in and out of alignment with the lens and image sensor. In low light operations, an infrared filter is actuated between the lens and image sensor instead of the visible light filter so that infrared light passes to the images sensor along with visible light. The infrared filter may also support secure camera operations that allow infrared images to detect facial or other depth impressions for end user identification without allowing capture of visual images. The field of view of the infrared image may also be adapted by selectively sliding the transparent piece between the lens and image sensor. In various embodiments, the filter configurations are controlled by logic on the CPU and/or logic running locally on a processing resource of the camera.

Figure 2:
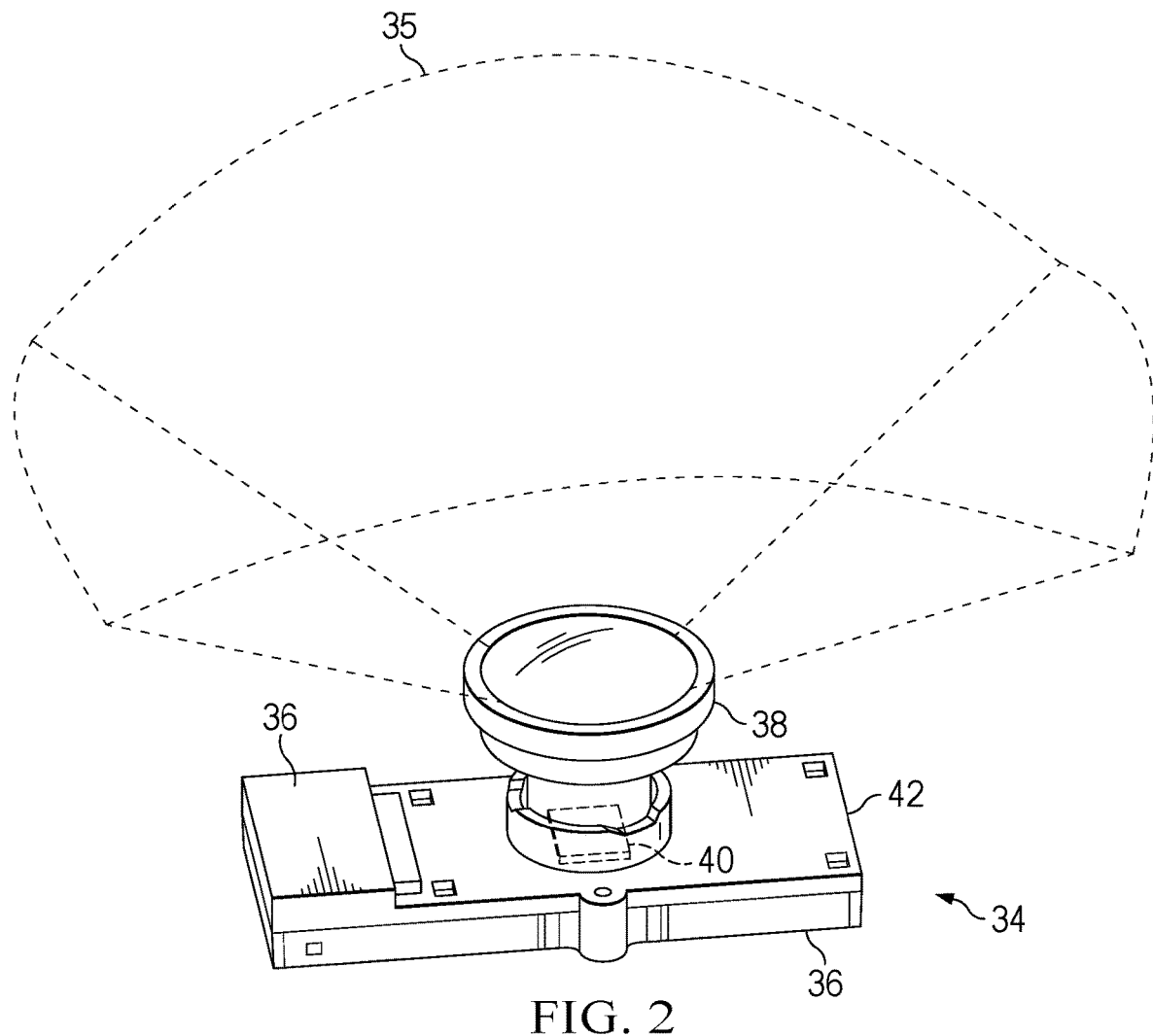
FIG. 2 depicts a perspective view of a camera configured to fit in an information handling system and having multiple actuators to actuate multiple light filters.

Referring now to FIG. 2, a perspective view depicts a camera 34 configured to fit in an information handling system and having multiple actuators 36 to actuate multiple light filters. Camera 34 has a field of view 35 that is adjusted with a transparent material of a defined thickness is placed between the lens 38 and images sensor 40 so that light is refracted to, in effect, change the focal length of the lens, such as by zooming focus out. Both actuators 36 couple to a casing 42 with one actuator 36 at each of opposing sides of lens 38. The filter thickness for each of the multiple filters is minimal to slide between lens 38 and image sensor 40 without increasing the height of the camera so that the camera will fit into a low profile lid housing portion. Each actuator 36 is displaced off to a side of lens 38 so that the height of the camera is not impacted by the height of the actuator. Casing 42 is assembled around the actuators to incorporate the image sensor and lens to provide a single piece camera for assembly into the information handling system housing. In the example embodiment, image sensor 40 includes a processing resource and non-transitory memory to execute instructions that control actuators 36. Alternatively, a processing resource and non-transitory memory separate from the image sensor may be used.

Figure 3:
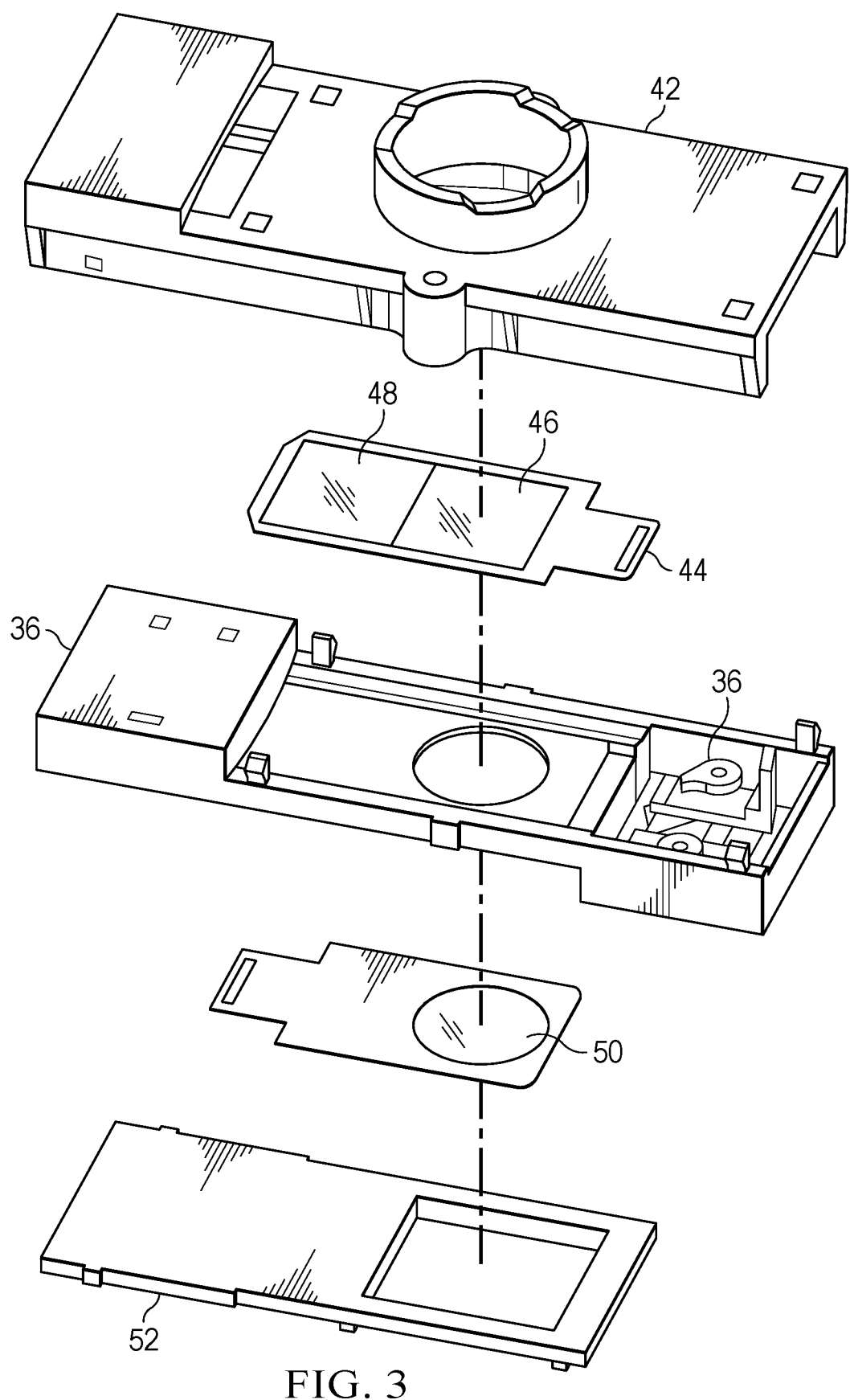
FIG. 3 depicts a perspective exploded view of multiple actuators configured to select multiple light filters for insertion between a camera lens and light sensor.

Referring now to FIG. 3, a perspective exploded view depicts multiple actuators 36 configured to select multiple light filters for insertion between a camera lens and light sensor. Casing 42 assembles as a top portion having a coupling location to accept the lens, a middle portion that accepts an actuator 36 on both sides of the lens coupling location, and a bottom plate 52 having an opening to pass light to an image sensor. An upper filter frame 44 couples an infrared filter 46 that passes infrared light and filters other light and a visible light filter 48 that passes visible light and filters nonvisible light. In the example embodiment, filter frame 44 couples to one of the actuators 36 so that only one of infrared filter 46 or visible filter 48 is aligned between the lens and image sensor at a time. A lower filter 50 has only one filter in a frame structure so that one of the actuators 36 either slides filter 50 between the lens and image sensor or slides filter 50 to a side so that it does not align between the lens and images sensor. In one embodiment, an solid and nontransparent portion of the frame of filter 50 can block all passage of light for security against unauthorized capture of visual images. As is described above, filter 50 is a transparent piece of material that refracts light to adjust the field of view of the camera between wide and narrow settings. In the example embodiment, filter frame 44 is captured between the top and middle portions of casing 42 and filter 50 is captured by the bottom plate coupling against the middle portion of casing 42. This assembly allows both filter frame 44 and filter 50 to operate simultaneously and separately without interfering with each other. Since only the thin filter portion is slid between the lens and the image sensor while the actuators are located off to the sides of the lens, the multiple filters do not add thickness height to the camera assembly. In alternative embodiments where separate filter frames might interfere with each other when sliding between the lens and image sensor, logic executing on the camera may prevent movement of a filter frame until it is clear to move without interference by other filter frames.

Figure 4:
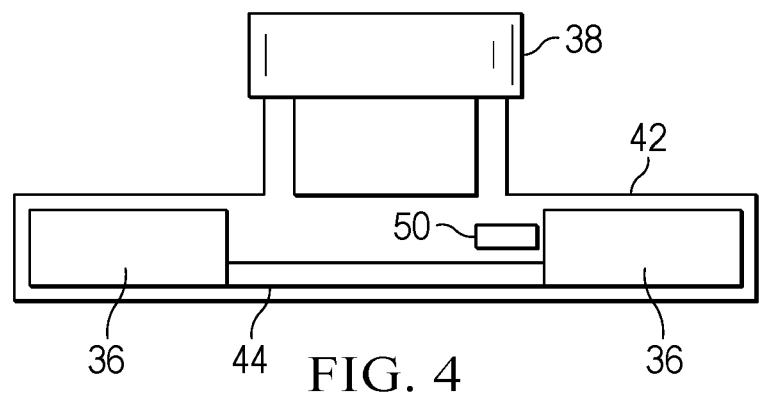
FIG. 4 depicts a side sectional view of the multiple actuators configured to select multiple light filters for insertion between a camera lens and image sensor.

Referring now to FIG. 4, a side sectional view depicts the multiple actuators 36 configured to select multiple light filters for insertion between a camera lens and image sensor. In the example embodiment, filter 50 slides in a position closer to lens 38 and filter frame 44 slides in a position closer to the image sensor. The vertical positioning of filter 50 impacts the lens effect of refraction of light and may be adjusted as desired. Although the example embodiment uses a transparent filter 50 to refract light and provide a lens effect to adjust the camera field of view, in alternative embodiments, filter 50 may also have some filtering of light to improve camera operations, such as a visual or infrared filter. Another factor that can determine the vertical stacking position of filter 50 is the thickness of the refractive material versus the amount of space available between the lens and the image sensor. Frame 44 slides relative to lens 38 so that one of the infrared filter or visual light filter is disposed between the lens and image sensor. In the example embodiment, adequate vertical stack spacing exists to independently operate both actuators, including simultaneous operation necessary. In an alternative embodiment, logic in the camera manages positions of filters so that actuation of the filters do not interfere with each other when the filters associated with different actuators overlap in the vertical stack. Although the example embodiment has filter 50 configured with a greater thickness to refract light and provide a lens zoom effect, in one example embodiment, the filter frame 44 may include filters of different thickness to perform the lens effect. For instance, one filter in frame filter 44 may have an increased thickness that has the lens effect while another filter has a reduced thickness to remove the lens effect. In such an example embodiment, the filter 50 may have a reduced thickness across two filter areas that select infrared versus visual light filters.

Figure 5:
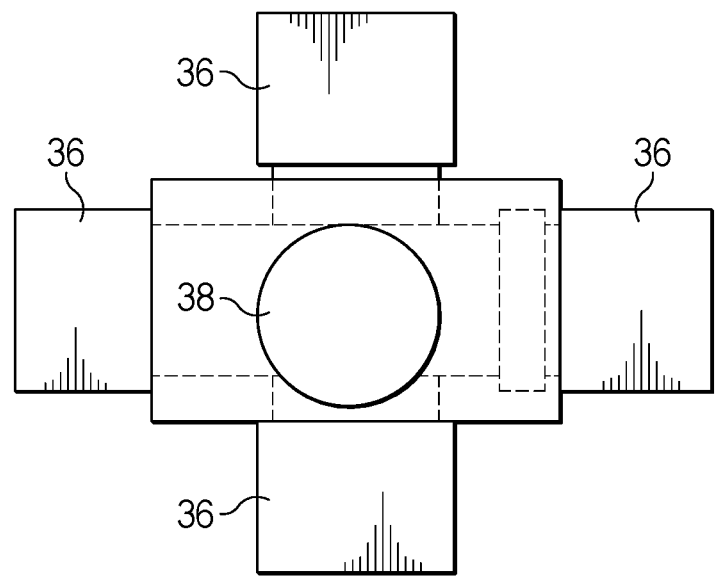
FIG. 5 depicts an upper view of an alternative embodiment of a camera having multiple actuators and multiple light filters aligned at offset angles.

Referring now to FIG. 5, an upper view depicts an alternative embodiment of a camera 34 having multiple actuators 36 and multiple light filters aligned at offset angles. In the example embodiment, four actuators 36 couple to the sides of lens 38 at ninety degree angles and each actuator slides a filter frame having at least one filter. The filters selectively align between the lens and image sensor so that no vertical gap increase is needed and the height of the camera does not increase to accommodate the filters. Indeed, the vertical stack of camera 34 with one actuator can be managed to be the same with all four actuators. In one embodiment, the vertical stack is minimized by having at least first and second of the filters associated with first and second of the actuators to slide in a common plane and preventing the filters in the common plane from simultaneously aligning with the lens and images sensor by using logic executing on a processing resource of the camera. In one embodiment, the additional actuators interface with filters having different thicknesses that each offer a different amount of focus/zoom with the camera. For example, a camera has a first focus/zoom without a thickened filter, a second focus/zoom with a first thickened filter and a third focus/zoom with a second thickened filter of greater thickness than the first thickened filter. The filters have a planar surface to refract light without the curves of a lens, which can increase the height of the camera. If sufficient room is available between the lens and the image sensor, the filter can itself include a lens shape to offer further zoom.

Although the present invention has been described in detail, it should be understood that various changes, substitutions and alterations can be made hereto without departing from the spirit and scope of the invention as defined by the appended claims.

What is claimed is:

1. An information handling system comprising:
a housing;
a processor disposed in the housing operable to execute instructions that process information;
a memory interfaced with the processor in the housing, the memory operable to store the instructions and information;
an embedded controller interfaced with the processor and operable to manage physical conditions within the housing;
a display coupled to the housing and interfaced with the processor, the display operable to present the information as visual images;
a camera coupled to the housing and operable to capture visual images with an image sensor aligned with a lens, the camera having a first actuator coupled to a first filter at a first side of the lens and a second actuator coupled to a second filter at a second side of the lens, the first and second actuators operable to selectively insert the first and second filters between the lens and the image sensor;
a filter frame, the first filter coupled to one side of the filter frame;
a third filter coupled to the filter frame at an opposite side of the first filter, the first actuator actuating the filter frame to have only one of the first and third filters inserted between the lens and the image sensor at a time;
a third actuator located at a third side of the lens and coupled to a fourth filter aligned to insert between the lens and the image sensor; and
a fourth actuator located at a fourth side of the lens opposite the third side and coupled to a fifth filter aligned to insert between the lens and image sensor.

2. The information handling system of claim 1 wherein:
the first filter comprises an infrared filter configured to pass infrared light; and
the second filter comprises a neutral density filter having transparency and a predetermined thickness associated with refraction of light to adjust a focus of the camera.

3. The information handling system of claim 2 wherein the first and second filters insert between the lens and image sensor simultaneously and separately.

4. The information handling system of claim 1 wherein the first filter comprises a visual light filter and the second filter comprises an infrared filter.

5. The information handling system of claim 1 wherein the first filter comprises a visual light filter and the second filter comprises a neutral density filter associated with control of flicker in visual images captured by the camera.

6. The information handling system of claim 1 wherein:
the fourth filter comprises a transparent material of a first thickness configured to adjust camera focus by a first amount; and
the fifth filter comprises the transparent material of a second thickness configured to adjust camera focus by a second amount.

7. The information handling system of claim 1 wherein the fifth filter comprises a lens configured to focus visual images captured by the camera.

8. A method for capturing images with a camera coupled in an information handling system, the method comprising:
selectively inserting a first filter between lens and image sensor of the camera with a first actuator located on a first side of the lens;
selectively inserting a second filter between the lens and image sensor of the camera with a second actuator located on a second side of the lens;
selectively inserting a third filter between the lens and image sensor of the camera with a third actuator located on a third side of the lens; and
selectively inserting a fourth filter between the lens and image sensor of the camera with a fourth actuator located on a fourth side of the lens.

9. The method of claim 8 further comprising:
inserting the first filter to filter light outside of a visual spectrum; and
inserting the second filter to adjust focus of the visual image by refraction of light through a transparent material of the second filter having a thickness associated with adjusted focus.

10. The method of claim 9 further comprising:
coupling the lens, image sensor, first actuator and second actuator to a casing;
sliding the first filter in an upper side of the casing; and
sliding the second filter in a lower side of the casing.

11. The method of claim 8 wherein:
the third filter has a first predetermined thickness associated with a first focus of visual images captured at the camera; and
the fourth filter has a second predetermined thickness associated with a second focus of the visual images captured at the camera.

12. The method of claim 8 further comprising:
coupling the first filter to the first actuator with a filter frame;
coupling a third filter to the filter frame; and
actuating the first actuator to selectively insert only one of the first and third filter between the lens and image sensor at a time.

13. The method of claim 12 further comprising:
actuating the second actuator to insert the second filter between the lens and image sensor while the one of the first and third filter are inserted between the lens and the image sensor.

14. A camera comprising:
a casing;

a lens coupled to the casing;
an image sensor coupled to the casing aligned with the lens;
a first actuator coupled to the casing at a first side of the lens;
a second actuator coupled to the casing at a second side of the lens;
a first filter coupled to the first actuator to selectively insert between the lens and the image sensor;
a second filter coupled to the second actuator to selectively insert between the lens and the image sensor;
a third actuator coupled to the casing at a third side of the lens;
a fourth actuator coupled to the casing at a fourth side of the lens;
a third filter coupled to the third actuator to selectively insert between the lens and the image sensor; and
a fourth filter coupled to the fourth actuator to selectively insert between the lens and the image sensor.

15. The camera of claim 14 wherein the first filter comprises a visual light filter configured to pass through visual light and the second filter comprises a neutral density filter configured to adjust a focus of the camera.

16. The camera of claim 14 further comprising a filter frame coupled to the fourth actuator and the fourth filter, the filter frame including a fifth filter, the fourth actuator selectively inserting only one of the fourth and fifth filters between the lens and the image sensor at a time.

* * * * *